United States Patent [19]
Freiberg et al.

[11] 4,077,708
[45] Mar. 7, 1978

[54] MICROFILM READER

[75] Inventors: Günter Freiberg; Adolf Koopmann, both of Munich; Günther Lüder, Taufkirchen; Ruth Opperman, Ismaning; Wilfried Hofmann, Taufkirchen, all of Germany

[73] Assignee: AGFA-Gevaert, A.G., Leverkusen, Germany

[21] Appl. No.: 723,884

[22] Filed: Sep. 16, 1976

[30] Foreign Application Priority Data

Sep. 20, 1975 Germany .............................. 2542043

[51] Int. Cl.² ...................... G03B 21/10; G03B 23/08
[52] U.S. Cl. .................................... 353/27 R; 353/23
[58] Field of Search .................... 353/25, 27 R, 27 A, 353/95, 22–24

[56] References Cited

U.S. PATENT DOCUMENTS

| 2,534,561 | 12/1950 | Silver | 353/27 R |
| 3,817,612 | 6/1974 | Maier et al. | 353/27 R |
| 3,868,179 | 2/1975 | Zeutschel | 353/27 R |

Primary Examiner—Harry N. Haroian
Attorney, Agent, or Firm—Michael J. Striker

[57] ABSTRACT

A holding frame holds a microfiche. Guide rails mount the holding frame on the microfilm reader housing for movement along two perpendicular coordinate axes for moving selected portions of the microfiche held by the frame into position to be projected. An arresting device arrests the frame in selected positions and includes a stationary clamped structure on the housing and a cooperating releasable clamping structure on the frame. The clamping structure when not released clamps the clamped structure and thereby arrests the frame relative to the housing.

6 Claims, 2 Drawing Figures

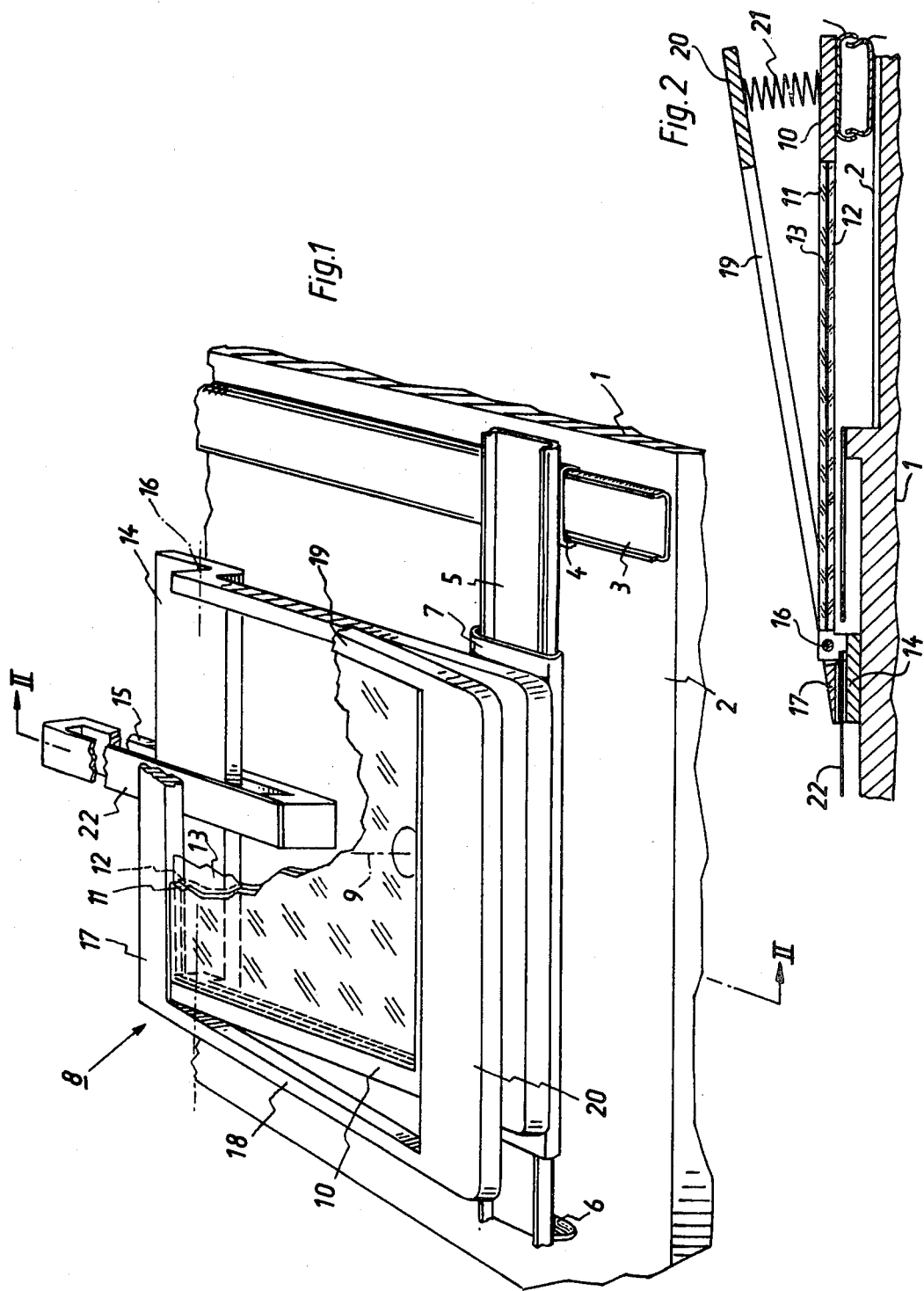

MICROFILM READER

BACKGROUND OF THE INVENTION

The invention relates to a microfilm reader provided with a holding frame for holding a microfiche. The holding frame is guided for movement along two perpendicular coordinate axes, so that selected portions of the microfiche can be moved into position for projection.

With known devices of this general type, the holding frame for the microfiche is shifted along the two perpendicular coordinate axes, within the plane defined by such axes, by hand, until such time as the desired one of the microfilm images, from out the plurality of rows and columns of images on the microfiche, has been brought into the projection position of the viewing objective.

Because such shifting of the holding frame for the microfiche should be easily performed manually, it has been desired to provide for the microfiche holding frame a mounting means which exhibits the least possible frictional resistance to such shifting movement and which permits very light manually exerted shifting forces to effect the required shifting movement. However, when such expedients are adopted, there arises the danger of unintentional shifting of the microfiche holding frame due to light accidental touching of the frame, or due to movement of the supporting structure for the microfilm reader, for example if the microfilm reader is located in a moving vehicle. Such unintentional shifting results in the display of portions of the microfiche other than the portion desired to be projected.

With these difficulties in mind, it has been proposed to provide an arresting means for arresting the microfiche holding frame in the selected position. The proposed arresting means made use of braking elements operable for engaging brake bars to arrest the holding frame in place. The braking elements were activatable by means of control cables. This arresting mechanism was of relatively complicated construction and moreover exhibited the significant disadvantage that, in the process of applying the requisite arresting force, torques and lever forces were transmitted to the holding frame, and these turning forces had the effect of tending again to displace the microfiche holding frame from the selected position.

SUMMARY OF THE INVENTION

It is a general object of the invention to provide an arresting expedient for arresting the microfiche holding frame in the selected position, such that the arresting means be very simple, reliable in operation, easy to activate, and so designed that the arresting forces generated by the arresting mechanism be borne exclusively by the arresting mechanism itself and not be undesirably transmitted to portions of the microfilm reader structure not actually constituting part of the arresting mechanism.

This object, and others which will become more understandable from the description, below, of a preferred embodiment, can be met according to one advantageous concept of the invention by providing a holding frame for the microfiche; guide means mounted on the microfilm reader housing and guiding the holding frame for movement along two perpendicular coordinate axes for moving selected portions of the microfiche held by the frame into position to be projected, and arresting means for arresting the frame in the selected position.

The arresting means includes a stationary clamped structure on the housing and a cooperating releasable clamping structure on the holding frame. The clamping structure when not released clamps the clamped structure and thereby arrests the frame relative to the housing.

According to a further advantageous concept of the invention, the holding frame defines a generally rectangular area for accommodating the microfiche, each of the two perpendicular coordinate axes extending parallel to a respective one of the sides of the rectangular area. The clamping structure comprises an elongated releasable clamp located to one side of the rectangular area of the holding frame, with the elongated clamp extending parallel to such one side and having a length at least approximately as long as such one side. The clamped structure comprises an elongated clamped member extending perpendicular to the elongation of the elongated clamp and clamped by the latter from above and below, the clamped member having a length at least approximately as long as one of the sides of the rectangular area parallel thereto.

According to a further concept of the invention, the elongated clamped member is a flat member lying in a plane parallel to the plane defined by the two perpendicular coordinate axes. The flat clamped member is supported on the reader housing at the opposite ends of the clamped member but extends intermediate its ends spaced from the housing. The guide means comprises a pair of perpendicular guide rails. One of the two parallel sides of the holding frame is supported by the one of the guide rails parallel thereto. The other of such two parallel sides of the holding frame is located intermediate the elongated clamped member and the housing and rests upon the housing. The elongated releasable clamp is a pincers-like clamp comprised of two elongated pincer jaws engaging the elongated clamped member from opposite sides thereof. The plane of the elongated clamped member coincides with the plane which would anyway contain the line of contact between the two pincer jaws in unreleased condition of the elongated clamp if the clamped member were not present. This keeps the arresting forces within the arresting mechanism itself.

To position the microfiche holding frame, the elongated clamp is released, so that the latter and accordingly the holding frame as a whole can be shifted relative to the elongated clamped member. When the elongated clamp is permitted to close again, the holding frame becomes secured in place relative to the elongated clamped member. The elongated clamped member is advantageously a flat metal strip clamped from opposite sides. Due to the yieldability of the flat metal strip in direction normal to the microfiche plane, no stress is transmitted to the housing of the microfilm reader from the holding frame, or vice versa, even if the clamped strip tends not to exactly coincide with the plane containing the line of contact between the pincer jaws of the elongated clamp. The microfiche holding frame can be arrested in any position desired.

According to an advantageous concept of the invention, the pincers-like clamp is comprised of two pincer jaws. One pincer jaw is not pivotable but instead rigidly connected to the microfiche holding frame, being arranged in a plane parallel to the microfiche plane but beneath the latter and resting upon the housing of the microfilm reader. The pivotable one of the two pincer jaws is provided with an activating member located at the opposite side of the holding frame. With this construction, only one pivotable component is actually necessary, mounted on the holding frame, this one pivotable component having its rearward part constitute the pivotable one of the two pincer jaws and having its forward part constitute the activating member for releasing the elongated clamp.

Advantageously, the activating member for releasing the elongated clamp extends over the whole side of the holding frame parallel thereto, so that the activation of the activating member requires very little aiming or attention on the part of the user of the microfilm reader.

Advantageously, the arresting means is provided with a biasing spring which tends to maintain the elongated clamp in clamping condition, so that when the activating member is let go the clamp automatically arrests the microfiche holding frame in place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partially broken away view of a microfilm reader construction according to the invention; and FIG. 2 is a section taken along line II-II of the construction shown in FIG. 1.

DESCRIPTION OF THE PREFERRED EMBODIMENTS

In FIG. 1, a guide rail 3 is secured on the support plate 2 of the housing 1 of the microfilm reader. A further guide rail 5 is secured at its right side to a carriage 4 which rides upon the guide rail 3. At its left end, the guide rail 5 is supported by a slide element 6 which keeps the left end of guide rail 5 at an elevation corresponding to that of its right end. The slide element 6 slides upon the support plate 2 of housing 1 when the right end of guide rail 5 is shifted along guide rail 3. Guide rail 5 serves to guide a further carriage 7 secured to the front part of the microfiche holding frame 8.

By means of the x-y coordinate-axis guidance of the microfiche holding frame 8, the latter can be shifted in a plane parallel to the plane of the support plate 2 so that any desired portion of the microfiche 13 can be brought into the projection beam, shown in FIG. 1 by means of a dash-dot line and denoted by numeral 9.

The sides 10 of the holding frame accommodate two transparent plates 11, 12 between which the microfiche 13 is retained. The upper plate 11 can be lifted, in nonillustrated manner, to permit exchange of one microfiche for another. The rearward part of the microfiche holding frame (the upper part as viewed in FIG. 1) is comprised of an elongated slab-like portion 14 which constitutes one of the two pincer jaws of an elongated clamp discussed below. This rear portion 14 of the holding frame rests upon a rib 15, as most clearly seen in FIG. 2.

A second pincer jaw 17 is pivotable about a journal 16 on the microfiche holding frame 10, and is connected by means of two levers 18, 19 to an activating member 20. A compression spring 21 tends to press the two pincer jaws 14, 17 of the elongated clamp together, to cause the elongated clamp to clamp the metal band 22 secured on the U-shaped rib 15 to arrest the microfiche holding frame in position.

Further aspects of the illustrated construction can be most clearly seen in FIG. 2.

The rib 15 is of generally U-shaped cross-sectional configuration and supports and secures a metal strip 22 at the ends of the metal strip 22. Intermediate its ends, the metal strip 22 is unsupported from below. The lower pincer jaw 14 of the elongated pincers-like clamp rests upon the elongated major portion of the rib 15 and engages the metal strip 22 from below when the elongated pincers-like clamp is in clamping condition. In contrast, the elongated upper pincer jaw extends above the metal strip 22. Both the upper and lower pincer jaws 14 and 17 extend transverse to the direction of elongation of the rib 15. Moreover, both pincer jaws 14 and 17 extend over the whole length of the side of the microfiche holding area parallel thereto. Thus, no matter how much the microfiche holding frame 8 is displaced to the left or the right, the metal strip 22 will continue to be located intermediate the upper and lower pincer jaws 17 and 14, so that the holding frame can be arrested by permitting the jaws 17, 14 to clamp the metal strip 22. Likewise, the clamped member 22 extends for a distance at least as great as the side of the rectangular microfiche holding area extending parallel to member 22. Thus, when the clamp 14, 17 is released, the microfiche holding frame 8 can be shifted forward or rearward along its whole length and be arrestable in any position within its range of movement.

When the user of the microfilm reader wishes to shift the holding frame 8, he presses the activating member 20. Via levers 18, 19, the upper elongated pincer jaw 17 is caused to pivot upward, thereby releasing the clamped member 22. Now, the microfiche holding frame 8 is being supported at its rear side, constituted by the non-pivoting lower jaw 14 itself, upon the upper surface of rib 15 of housing 1, and at its front side by the guide rail 3 and the sliding element 6. The holding frame 8 is moved to any desired position, whereupon the user lets go of the activating member 20. The compression spring 21 causes the activating member 20 to pivot up, bringing the upper pincer jaw 17 down, so that the elongated clamp 14, 17 again grips the stationary clamped member 22 from the opposite sides of the latter, arresting the holding frame 8 in position.

Advantageously, the clamped strip 22 occupies a plane such that if strip 22 were removed from the construction, the line or plane of contact of the two cooperating jaws 14, 17 would nevertheless coincide with the plane occupied by strip 22 when strip 22 is in the construction. The purpose of this feature is to ensure that the arresting force generated by the clamping member is kept within the arresting mechanism itself and not transmitted from the microfiche holding frame 8 to the microfilm reader housing 1, or vice versa. For example, if the feature in question were not present, release by the user of the activating member 20 to initiate the arresting action could conceivably cause the arresting mechanism to brace itself against the metal strip 22 and pull upward upon the guide rail 5, or else could cause the holding frame 8 to brace itself against the guide rail 5 and pull upward upon the metal strip 22.

The provision of the activating member 20 at the side of the rectangular area of the holding frame opposite to that provided with the elongated clamping jaw, in conjunction with the provision of the long levers 18, 19, makes a very small force sufficient to effect release of even a relatively strong clamp.

It will be understood that each of the elements described above, or two or more together, may also find a useful application in other types of constructions differing from the types described above.

While the invention has been illustrated and described as embodied in other microfilm reader constructions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a microfilm reader having a housing, in combination, a holding frame for holding a microfiche; guide means mounted on the housing and guiding the frame for movement along two perpendicular coordinate axes for moving selected portions of the microfiche held by the frame into position to be projected; and arresting means for arresting the frame in the selected position, the arresting means including a stationary clamped structure on the housing and a cooperating releasable clamping structure on the frame, the clamping structure when not released clamping the clamped structure and thereby arresting the frame relative to the housing, the holding frame defining a generally rectangular area for accommodating microfiches, each of the two perpendicular coordinate axes extending parallel to a respective one of the sides of the rectangular area, the clamping structure comprising an elongated releasable clamp located to one side of the rectangular area of the holding frame, the elongated clamp extending parallel to such one side and having a length at least approximately as long as such one side, the clamped structure comprising an elongated clamped member extending perpendicular to the elongation of the elongated clamp and clamped by the latter from opposite sides, the clamped member having a length at least approximately as long as one of the sides of the rectangular area parallel thereto.

2. In a microfilm reader as defined in claim 1, the elongated clamped member being a flat clamped member which lies in a plane parallel to the plane defined by the two perpendicular coordinate axes, the flat clamped member being supported on the reader housing at the opposite ends of the member but extending intermediate its ends spaced from the housing, the guide means comprising a pair of perpendicular guide rails, one of two parallel sides of the holding frame being supported by the one of the guide rails parallel thereto, the other of such two parallel sides of the holding frame being located intermediate the elongated clamped member and the housing and resting upon the housing, the elongated releasable clamp being a pincers-like clamp comprised of two pincer jaws engaging the elongated clamped member from opposite sides thereof, the plane of the elongated clamped member coinciding with the plane which would anyway contain the line of contact between the two pincer jaws in unreleased condition of the elongated clamp if the clamped member were not present.

3. In a microfilm reader as defined in claim 2, one of the two jaws of the elongated pincers-like clamp being rigidly connected to the holding frame for the microfiches, being arranged in a plane which is parallel to the plane of a microfiche held by the holding frame but beneath such microfiche, and resting on a stationary part of the housing of the microfilm reader, the other of the two jaws of the elongated pincers-like clamp being the pivotable one and being provided with an activating member for releasing the elongated clamp, the elongated clamp being arranged alongside one side of the holding frame, the activating member being arranged alongside the side of the holding frame opposite to such one side.

4. In a microfilm reader as defined in claim 3, the activating member being an elongated activating member extending over substantially the entire length of one side of the rectangular area for the microfiches.

5. In a microfilm reader as defined in claim 1, the releasable clamping structure including a biasing spring normally maintaining the clamping structure in clamping condition.

6. In a microfilm reader having a housing, in combination, a holding frame for holding a microfiche; guide means mounted on the housing and guiding the frame for movement along two perpendicular coordinate axes for moving selected portions of the microfiche held by the frame into position to be projected; and arresting means for arresting the frame in the selected position, the arresting means comprising a stationary clamped structure on the housing and a cooperating releasable clamping structure on the frame, the clamping structure when not released clamping and thereby frictionally engaging the clamped structure and exclusively by virtue of the frictional engagement between the clamping and clamped structure preventing movement of the frame relative to the housing along the perpendicular coordinate axes.

* * * * *